United States Patent
Chen et al.

(10) Patent No.: US 8,897,202 B2
(45) Date of Patent: Nov. 25, 2014

(54) RELAY NODE FOR TRANSMITTING DATA BY USING SCHEDULING INFORMATION OF MULTIPLE SUBFRAMES SCHEDULING AND METHOD FOR THE RELAY NODE TRANSMITTING DATA BY SCHEDULING INFORMATION OF MULTIPLE SUBFRAMES SCHEDULING

(75) Inventors: Si Chen, Shenzhen (CN); Jian Zhang, Shenzhen (CN); Yincheng Zhang, Shenzhen (CN); Guanzhou Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 209 days.

(21) Appl. No.: 13/384,309

(22) PCT Filed: Aug. 17, 2010

(86) PCT No.: PCT/CN2010/076069
§ 371 (c)(1),
(2), (4) Date: Jan. 16, 2012

(87) PCT Pub. No.: WO2011/038618
PCT Pub. Date: Apr. 7, 2011

(65) Prior Publication Data
US 2012/0176957 A1    Jul. 12, 2012

(30) Foreign Application Priority Data

Sep. 29, 2009    (CN) .......................... 2009 1 0174167

(51) Int. Cl.
*H04B 7/14*    (2006.01)
(Continued)

(52) U.S. Cl.
CPC .......... *H04W 72/1278* (2013.01); *H04B 7/155* (2013.01); *H04L 5/0053* (2013.01);
(Continued)

(58) Field of Classification Search
None
See application file for complete search history.

(56) References Cited

U.S. PATENT DOCUMENTS

2008/0274692 A1    11/2008  Larsson
2009/0111476 A1*    4/2009  Hamalainen et al. ......... 455/450
(Continued)

FOREIGN PATENT DOCUMENTS

CN    101322327 A    12/2008
CN    101478337 A     7/2009

OTHER PUBLICATIONS

International Search Report for PCT/CN2010/076069, English Translation attached to original, Both completed by the Chinese Patent Office on Nov. 15, 2010, 8 Pages.

*Primary Examiner* — Ayaz Sheikh
*Assistant Examiner* — Peter Chau
(74) *Attorney, Agent, or Firm* — Brooks Kushman P.C.

(57) ABSTRACT

A relay node and a method thereof for transmitting data are provided in the present invention, which relates to the field of wireless communication technology. The method in the present invention includes: the relay node receiving data on multiple corresponding continuous or discontinuous downlink backhaul subframes according to the obtained scheduling information of downlink multiple subframes scheduling, and sending data on multiple corresponding continuous or discontinuous uplink backhaul subframes according to the obtained scheduling information of uplink multiple subframes scheduling. The technical solution of the present invention solves a problem of scheduling resources of multiple subframes for the relay node. Compared to a dynamic scheduling and semi-persistent scheduling method in the prior art, the technical solution of the present invention can more flexibly configure and use resources to ensure transmission of the backhaul link between a base station and the relay node.

20 Claims, 2 Drawing Sheets

(51) Int. Cl.
  *H04J 1/10* (2006.01)
  *H04J 3/08* (2006.01)
  *H04W 72/12* (2009.01)
  *H04B 7/155* (2006.01)
  *H04L 5/00* (2006.01)
  *H04W 84/04* (2009.01)

(52) U.S. Cl.
  CPC ............ *H04L 5/0082* (2013.01); *H04L 5/0094* (2013.01); *H04W 84/047* (2013.01)
  USPC .......... 370/315; 370/310; 370/312; 370/319; 370/322; 370/328; 370/329; 370/330; 370/337; 370/341; 370/351; 370/398; 370/395.4; 370/400; 370/431; 370/432; 370/436; 370/437; 370/443; 370/458; 370/464

(56) References Cited

U.S. PATENT DOCUMENTS

| | | | |
|---|---|---|---|
| 2009/0201846 A1* | 8/2009 | Horn et al. | 370/315 |
| 2010/0002656 A1* | 1/2010 | Ji et al. | 370/336 |
| 2010/0070815 A1* | 3/2010 | Papasakellariou et al. | 714/748 |
| 2010/0150173 A1* | 6/2010 | Yu et al. | 370/474 |
| 2010/0254301 A1* | 10/2010 | Blankenship et al. | 370/315 |
| 2010/0271999 A1* | 10/2010 | Yu et al. | 370/312 |
| 2010/0275083 A1* | 10/2010 | Nam et al. | 714/748 |
| 2010/0316096 A1* | 12/2010 | Adjakple et al. | 375/211 |
| 2011/0103292 A1* | 5/2011 | Pasad et al. | 370/315 |
| 2011/0164550 A1* | 7/2011 | Chen et al. | 370/315 |
| 2011/0222428 A1* | 9/2011 | Charbit et al. | 370/252 |
| 2011/0235571 A1* | 9/2011 | Seo et al. | 370/315 |
| 2011/0244787 A1* | 10/2011 | Kim et al. | 455/7 |
| 2012/0163287 A1* | 6/2012 | Raaf et al. | 370/315 |
| 2012/0170504 A1* | 7/2012 | Hoymann et al. | 370/312 |
| 2013/0077585 A1* | 3/2013 | Pan et al. | 370/329 |

\* cited by examiner

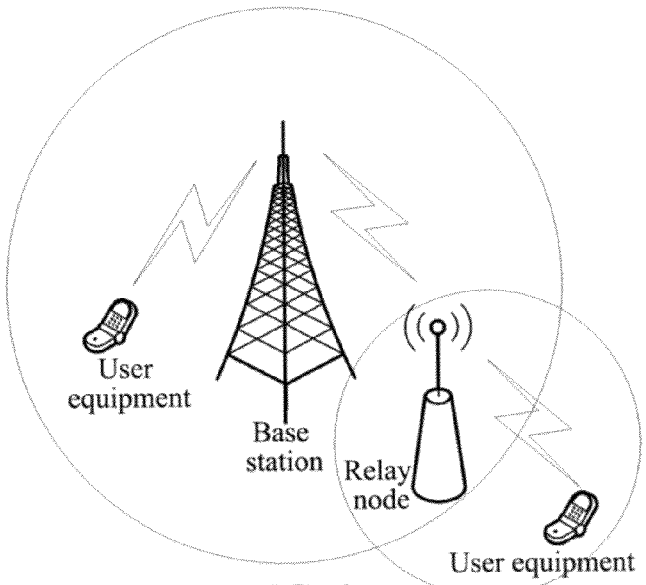

FIG. 1
(Prior Art)

The RN acquiring the configuration information of multiple subframes scheduling, wherein the configuration information of multiple subframes scheduling at least includes the configuration information of downlink backhaul subframes and the configuration information of uplink backhaul subframes — 201

The RN acquiring the scheduling information of multiple subframes scheduling, wherein the scheduling information of multiple subframes scheduling includes subframe information of the multiple subframes scheduling and PRB, MCS and HARQ information occupied by each scheduling subframe — 202

The RN determining the downlink assignment or uplink grant, so as to receive downlink data or send uplink data — 203

The RN sending or receiving the HARQ feedback of each subframe in the multiple subframes scheduling — 204

FIG. 2

RELAY NODE FOR TRANSMITTING DATA BY USING SCHEDULING INFORMATION OF MULTIPLE SUBFRAMES SCHEDULING AND METHOD FOR THE RELAY NODE TRANSMITTING DATA BY SCHEDULING INFORMATION OF MULTIPLE SUBFRAMES SCHEDULING

CROSS-REFERENCE TO RELATED APPLICATION

This application is the U.S. national phase of PCT Appin. No. PCT/CN2010/076069 filed Aug. 17, 2010 which claims priority to Chinese Application No. 200910174167.9 filed Sep. 29, 2009, the disclosures of which are incorporated in their entirety by reference herein.

TECHNICAL FIELD

The present invention relates to the field of wireless communication technology, and in particular, to a relay node and a method thereof for transmitting data.

BACKGROUND OF THE RELATED ART

The wireless interface Media Access Control (MAC) protocol layer of the Evolved Universal Terrestrial Radio Access Network (E-UTRAN, which is comprised of base station eNBs, and thus can also be referred to as base station eNBs) of the third generation mobile communication Long Term Evolution (LTE) system has a Scheduling/Priority Handling functional entity, wherein the scheduling function supports dynamic scheduling and semi-persistent scheduling (or can be referred to as semi-static scheduling).

The Dynamic Scheduling refers to that the E-UTRAN can dynamically allocate resources including the Physical Resource Block (PRB) and Modulation and Coding Scheme (MCS) etc. to an user equipment (UE) in each Transmit Time Interval (TTI, which corresponds to one subframe) through a Cell Radio Network Temporary Identifier (C-RNTI) on the Physical Downlink Control Channel (PDCCH) for the UE to receive/send data, wherein the uplink uses Downlink Control Information (DCI) format 0 and the downlink uses DCI format 1 to indicate the scheduling information, as shown in Table 1 and Table 2, and the main difference between them is that as the downlink Hybrid ARQ (HARQ) is an asynchronous HARQ, the downlink HARQ needs the indication of the process number of the HARQ, while as the uplink HARQ is a synchronous HARQ, the uplink HARQ does not need the indication of the identification. Both HARQ first transmission and HARQ retransmission of the UE can use the dynamic scheduling.

TABLE 1

| the primary definition domain of the DCI format 0 | |
|---|---|
| name | description |
| assignment information of a Resource Block | indicating the frequency domain resources which can be used by the UE |
| Modulation and Coding Scheme (MCS) | indicating the modulation mode and the coding rate which should be used by the UE to send data |
| New Data Indicator (NDI) | indicating whether the UE sends new data or retransmits old data |
| Uplink index | configuration 0 of the TDD mode, indicating which uplink subframe the uplink grant is used for |

TABLE 1-continued

| the primary definition domain of the DCI format 0 | |
|---|---|
| name | description |
| Downlink Assignment Index (DAI) | configurations 1-6 of the TDD mode, indicating the subframe of the HARQ feedback |

TABLE 2

| the primary definition domain of the DCI format 1 | |
|---|---|
| name | description |
| resource allocation Header | indicating the type of the resource allocation |
| Assignment information of Resource Block | indicating frequency domain resources which can be used by the UE |
| MCS | indicating that the modulation mode and the coding rate which should be used by the UE to send data |
| HARQ process number | indicating the HARQ process which is used by the UE |
| NDI | indicating whether the UE sends new data or retransmits old data |
| Redundancy Version (RV) | indicating the HARQ RV which is sent by the UE |
| DAI | configurations 1-6 of the TDD mode, indicating the subframe of the HARQ feedback |

The Semi-persistent Scheduling (SPS) refers to that the E-UTRAN can allocate semi-persistent resources including Physical Resource Block (PRB), Modulation and Coding Scheme (MCS) etc. to an user equipment (UE) through a Semi-Persistent Scheduling C-RNTI (C-RNTI) on the Physical Downlink Control Channel (PDCCH) for the UE to receive or send data. In the SPS, the HARQ first transmission of the UE uses semi-persistent resources, and the HARQ retransmission uses dynamic scheduling resources. The semi-persistent resources are repeated according to the configured period, and when the UE is configured with subframes of semi-persistent resources, if the UE does not detect the C-RNTI thereof on the PDCCH, the UE receives or sends data on the corresponding subframes according to the semi-persistent resources. When the UE is configured with semi-persistent resources, if the UE detect the C-RNTI thereof on the PDCCH, the UE uses dynamic resources indicated by the PDCCH to override the semi-persistent resources on the corresponding subframes.

Typically, the semi-persistent scheduling is applied to VoIP services, and the period of the semi-persistent resources allocated for the semi-persistent scheduling is 20 ms. The E-UTRAN configures semi-persistent scheduling parameters including semi-persistent scheduling Cell-Radio Network Temporal Identifier (C-RNTI), downlink semi-persistent scheduling configuration, uplink semi-persistent scheduling configuration etc. for the UE through Radio Resource Control (RRC) signaling. The downlink or uplink semi-persistent scheduling parameters can be configured respectively. The downlink semi-persistent scheduling parameters include information such as downlink semi-persistent scheduling period, the number of reserved HARQ processes, Physical Uplink Control Channel (PUCCH) feedback resources. The uplink semi-persistent scheduling parameters include information such as uplink semi-persistent scheduling period, implicit releasing parameters, Physical Uplink Shared Channel (PUSCH) related parameters, and further include two-period configuration information for the TDD mode. The E-UTRAN enables/disables downlink or uplink semi-persistent scheduling through the RRC signaling, and when the downlink or uplink semi-persistent scheduling is disabled, the corresponding semi-persistent resources are released. The LTE Frequency Divided Duplex (FDD) mode supports at most one period on the downlink or uplink respectively. The Time Divided Duplex (TDD) mode only support one period on the downlink and supports the two-period configuration on the uplink to avoid the conflict of the semi-persistent resources at the time of HARQ retransmission and HARQ first transmission. For the downlink, the E-UTRAN configures the number of HARQ processes which are reserved by the semi-persistent scheduling for the UE through the RRC, and the dynamic scheduling can share the HARQ processes which are reserved for the semi-persistent scheduling. For the uplink, the dynamic scheduling and semi-persistent scheduling can also share the same HARQ process. The E-UTRAN activates semi-persistent resources for the UE through the PDCCH. In order to reduce the complexity of the semi-persistent scheduling, the semi-persistent resources are allocated to the whole UE instead of a certain specific service. The downlink or uplink is configured with one semi-persistent resource (including information such as PRB, MCS etc.) at most respectively, and the semi-persistent resources occur periodically according to the downlink or uplink semi-persistent scheduling which is configured by the RRC signaling. The E-UTRAN explicitly releases the downlink or uplink semi-persistent resources of the UE through the PDCCH. For the uplink, implicitly releasing the semi-persistent resources is also supported, and the UE triggers the release of the semi-persistent resources according to a number of successive new Media Access Control Protocol Data Units (MAC PDUs) which does not include Media Access Control Service Data Unit (MAC SDU).

In order to satisfy the increasing demand for large bandwidth high speed mobile access, the Third Generation Partnership Projects (3GPP) provides a Long-Term Evolution Advanced (LTE-Advanced) standard. The LTE-Advanced reserves the LTE core for the evolution of the Long-Term Evolution (LTE), and on that basis, uses a series of technologies to expand the frequency domain and the spatial domain, so as to achieve the purposes of enhancing spectrum efficiency and increasing system capacity and so on. The Radio Relay technology is one of the LTE-Advanced technologies, and is intended to expand the coverage of the cell, reduce the dead region in the communications, balance the load, transfer the services of the hot spots, and save transmitting power of the terminal (or is referred to as User Equipment (UE)). As shown in FIG. 1, some new Relay-Nodes (RNs) are added between the Donor-eNB and the UE. These newly added RNs are wirelessly connected to the Donor-eNB, and there is no wired connection to the transmission network, wherein the wireless links between the Donor-eNB and the RNs are referred to as backhaul links, and the wireless links between the RNs and the UE is referred to as access links. The downlink data firstly reaches the Donor-eNB, and then is transmitted to the RN, which then transmits the downlink data to the UE; and it is opposite for the uplink.

In order to configure resources of the backhaul link, the Relay Physical Downlink Control Channel (R-PDCCH), Physical Share Channel (R-PDSCH) and Physical Uplink Share Channel are defined. The R-PDCCH is used to dynamically or semi-statically allocate the R-PDSCH resources and R-PUSCH resources, wherein the R-PDSCH resources are used to transmit downlink data of the backhaul link, and the R-PUSCH resources are used to transmit uplink data of the backhaul link.

The difference between the R-PDCCH and the PDCCH on indicating resource allocation is that the R-PDCCH can indicate downlink resources of multiple subsequent subframes in addition to the downlink resources of the current subframe, moreover, the R-PDCCH can also indicate uplink resources of multiple subsequent subframes. However, existing resource allocation methods are only suitable to schedule a resource of a single subframe, and thus, there is a need of a new scheduling method for the R-PDCCH to schedule resources of multiple subframes.

SUMMARY OF THE INVENTION

The technical problem to be solved by the present invention is to provide a Relay Node (RN) and a method thereof for transmitting data, so as to achieve scheduling resources of multiple subframes simultaneously.

In order to solve the above technical problem, the present invention provides a method for a Relay Node (RN) transmitting data, comprises:

the RN receiving data on multiple corresponding continuous or discontinuous downlink backhaul subframes according to the acquired scheduling information of downlink multiple subframes scheduling, and/or the RN sending data on multiple corresponding continuous or discontinuous uplink backhaul subframes according to the acquired scheduling information of uplink multiple subframes scheduling.

Preferably, the data received on the multiple corresponding continuous or discontinuous downlink backhaul subframes by the RN is Hybrid Automatic Retransmission Request (HARQ) first transmission, and the data sent on the multiple corresponding continuous or discontinuous uplink backhaul subframes by the RN is HARQ first transmission.

Preferably, the process of the RN acquiring the scheduling information comprises:

the RN receiving downlink assignment or uplink grant on the Relay Physical Downlink Control Channel (R-PDCCH) according to Cell-Radio Network Temporal Identifier (C-RNTI) or the RNTI for multiple subframes scheduling, with the downlink assignment or uplink grant including the scheduling information.

Preferably, the scheduling information comprises one or more of the following information:

the number of subframes of the multiple subframes scheduling, HARQ process number involved in the multiple subframes scheduling, the Physical Resource Block (PRB) of each subframe, Modulation and Coding Scheme (MCS) of each subframe, and the mapping relationship between the subframes for allocating resources and the subframes for transmitting data in the multiple subframes scheduling, the New Data Indicator (NDI) of each subframe and the Redundancy Version (RV) of each subframe.

Preferably, the downlink assignment and the uplink grant are indicated to the RN by the same Downlink Control Information (DCI) for the multiple subframes scheduling, or the downlink assignment and the uplink grant are indicated by different DCIs for multiple subframes scheduling respectively; and when the downlink assignment and the uplink grant are indicated by the same DCI for the multiple subframes scheduling, flag bits are added in the DCI for multiple subframes scheduling to represent whether the DCI indicates the downlink assignment for downlink multiple subframes scheduling or uplink grant for uplink multiple subframes scheduling.

Preferably, the DCI for indicating the downlink assignment is DCI format 1 or a newly added DCI format; and the DCI for indicating the uplink grant is DCI format 0 or a newly added DCI format.

Preferably, the RN acquires the RNTIs for multiple subframes scheduling through Radio Resource Control (RRC) signaling, wherein the RRC signaling is RRC connection reconfiguration message or newly added RRC signaling.

Preferably, a starting subframe in the multiple subframes scheduling is a subframe commonly indicated by a subframe on which the downlink assignment or uplink grant is received by the RN and HARQ timing; or the starting subframe in the multiple subframes scheduling is a subframe commonly indicated by a subframe on which the downlink assignment or uplink grant is received by the RN and the Relay HARQ timing; or the starting subframe in the multiple subframes scheduling is a subframe commonly indicated by the Relay HARQ timing and the mapping relationship between the subframe for the allocating resources and the subframe for transmitting data;

wherein, the RN acquires the Relay HARQ timing through system pre-definition or Radio Resource Control (RRC) signaling.

Preferably, the subsequent subframes in the multiple subframes scheduling are subframes commonly indicated by the Relay HARQ timing and the mapping between the subframe for allocating resources and the subframe for transmitting data; and the RN acquires the Relay HARQ timing through system pre-definition or Radio Resource Control (RRC) signaling.

Preferably, the process of the RN acquiring the scheduling information comprises:

the RN acquiring the downlink assignment or uplink grant through a Medium Access Control (MAC) Control Element (CE), with the downlink assignment or uplink grant including the scheduling information.

Preferably, the RN acquires the downlink assignment and uplink grant through the same MAC CE, or acquires the downlink assignment and uplink grant through different MAC CEs;

when the RN acquires the downlink assignment and uplink grant through the same MAC CE, flag bits are added in the MAC CE to represent whether the MAC CE indicates the downlink assignment for downlink multiple subframes scheduling or uplink grant for uplink multiple subframes scheduling.

Preferably, the RN notifies a base station of a failure of the reception when the RN fails to receive the MAC CE.

Preferably, the base station no longer retransmits the MAC CE when the base station is notified that the RN fails to receive the MAC CE.

Preferably, when the downlink assignment or uplink grant does not include the number of subframes of the multiple subframes scheduling, the RN acquires the number of subframes of the multiple subframes scheduling through the system pre-definition or Radio Resource Control (RRC) signaling before receiving the downlink assignment or uplink grant;

when the downlink assignment or uplink grant does not include the HARQ process number involved in the multiple subframes scheduling, the RN acquiring the HARQ process number of the starting subframe and the HARQ process number of the subsequent subframes of the multiple subframes scheduling through the system pre-definition or the corresponding relationship between the subframe and the process identification in RRC signaling, or acquiring the HARQ process number of the starting subframe of the multiple subframes scheduling through the system pre-definition or RRC signaling, and increasing the HARQ process number of the starting subframe in turn to acquire the HARQ process number of the subsequent subframes;

when the downlink assignment or uplink grant only includes one Physical Resource Block (PRB), the RN learning that each subframe in the multiple subframes scheduling occupies the same PRB;

when the downlink assignment or uplink grant only includes one Modulation and Coding Scheme (MCS), the RN learning that each subframe in the multiple subframes scheduling uses the same MCS;

when the downlink assignment or uplink grant does not include NDI, the RN learning that the NDI of each subframe in the multiple subframes scheduling is a default value; and when the downlink assignment or uplink grant does not include RV, the RN learning that the RV of each subframe in the multiple subframes scheduling is a default value.

Preferably, the starting subframe in the multiple subframes scheduling is a subframe commonly indicated by the subframe on which the RN receives the MAC CE and the system predefined time interval; or the starting subframe in the multiple subframes scheduling is the first downlink backhaul subframe or uplink backhaul subframe following the subframe on which the RN correctly receives the MAC CE.

Preferably, the process of the RN acquiring the scheduling information comprises:

the RN acquiring the RNTI for the multiple subframes scheduling through the dedicated RRC signaling, and then receiving the downlink assignment or uplink grant on the R-PDCCH according to the RNTI for the multiple subframes scheduling, with the downlink assignment or uplink grant including the scheduling information.

Preferably, the downlink assignment comprises the following scheduling information:

Physical Resource Block (PRB) of the starting subframe in the multiple subframes scheduling, Modulation and Coding Scheme (MCS) of the starting subframe in the multiple subframes scheduling, New Data Identifier (NDI) of the starting subframe in the multiple subframes scheduling, Redundancy Version (RV) of the starting subframe in the multiple subframes scheduling, HARQ process number of the starting subframe in the multiple subframes scheduling;

the uplink grant comprises the following scheduling information:

PRB of the starting subframe in the multiple subframes scheduling, MCS of the starting subframe in the multiple subframes scheduling, NDI of the starting subframe in the multiple subframes scheduling, RV of the starting subframe in the multiple subframes scheduling.

Preferably, the downlink assignment is indicated to the RN in the Downlink Control Information (DCI) format 1, and the uplink grant is indicated to the RN in the DCI format 0.

Preferably, the starting subframe in the multiple subframes scheduling is a subframe commonly indicated by a subframe on which the downlink assignment or uplink grant is received by the RN and HARQ timing; or the starting subframe in the multiple subframes scheduling is a subframe commonly indicated by a subframe on which the downlink assignment or uplink grant is received by the RN and the Relay HARQ timing;

wherein, the RN acquires the Relay HARQ timing through system pre-definition or Radio Resource Control (RRC) signaling.

Preferably, when acquiring the Physical Resource Block (PRB) of the starting subframe in the multiple subframes scheduling from the downlink assignment or uplink grant, the RN learning that the PRBs of the subsequent subframes in the multiple subframes scheduling are the same as the PRB of the starting subframe; and when acquiring the Modulation and Coding Scheme (MCS) of the starting subframe in the multiple subframes scheduling from the downlink assignment or uplink grant, the RN learning that the MCSs of the subsequent subframes in the multiple subframes scheduling are the same as the MCS of the starting subframe.

Preferably, the RN acquiring the number of subframes of the multiple subframes scheduling through system pre-definition or RRC signaling before receiving the downlink assignment or uplink grant;

the RN learning that the NDIs of the subsequent subframes in the multiple subframes scheduling have the same value as that of the NDI of the starting subframe, or the RN learning that the NDIs of the subsequent subframes in the multiple subframes scheduling are default values; and the RN learning that the Redundancy Versions (RVs) of the subsequent subframes in the multiple subframes scheduling have the same value as that of the RV of the starting subframe, or the RN learning that the RVs of the subsequent subframes in the multiple subframes scheduling are default values.

Preferably, the RN acquiring the corresponding relationship between the subframe and the HARQ process number through the system pre-definition or RRC signaling to acquire the HARQ process number of the subsequent subframes in the multiple subframes scheduling, or the RN increasing the HARQ process number of the starting subframe in turn to acquire the HARQ process number of the subsequent subframes in the multiple subframes scheduling.

Preferably, the RN acquires the RNTI for multiple subframes scheduling through the RRC signaling, with the RRC signaling being RRC connection reconfiguration message or being newly added RRC signaling.

The present invention further provides a Relay Node (RN), comprising an acquiring module and a transmitting module, wherein, the acquiring module is configured to acquire scheduling information of downlink multiple subframes scheduling and scheduling information of uplink multiple subframes scheduling; and the transmitting module is configured to receive data on multiple continuous or discontinuous downlink backhaul subframes indicated by the scheduling information of the downlink multiple subframes scheduling, and send data on multiple continuous or discontinuous uplink backhaul subframes indicated by the scheduling information of the downlink multiple subframes scheduling.

Preferably, the acquiring module is configured to receive downlink assignment or uplink grant on the Relay Physical Downlink Control Channel (R-PDCCH) according to Cell-Radio Network Temporal Identifier (C-RNTI) or the RNTI for multiple subframes scheduling, with the downlink assignment or uplink grant including the scheduling information.

Preferably, the scheduling information comprises one or more of the following information:

the number of subframes of the multiple subframes scheduling, HARQ process number involved in the multiple subframes scheduling, Physical Resource Block (PRB) of each subframe, Modulation and Coding Scheme (MCS) of each subframe, and the mapping relationship between the subframes for allocating resources and the subframes for transmitting data in the multiple subframes scheduling, New Data Indicator (NDI) of each subframe and Redundancy Version (RV) of each subframe.

Preferably, the acquiring module is configured to acquire the downlink assignment or uplink grant through a Medium Access Control (MAC) Control Element (CE), with the downlink assignment or uplink grant including the scheduling information.

Preferably, the acquiring module is configured to acquire the RNTI for the multiple subframes scheduling through the dedicated RRC signaling, and then receive the downlink assignment or uplink grant on the R-PDCCH according to the RNTI for the multiple subframes scheduling, with the downlink assignment or uplink grant including the scheduling information.

Preferably, the downlink assignment comprises the following scheduling information:

PRB of the starting subframe in the multiple subframes scheduling, MCS of the starting subframe in the multiple subframes scheduling, NDI of the starting subframe in the multiple subframes scheduling, RV of the starting subframe in the multiple subframes scheduling, HARQ process number of the starting subframe in the multiple subframes scheduling;

the uplink grant comprises the following scheduling information:

PRB of the starting subframe in the multiple subframes scheduling, MCS of the starting subframe in the multiple subframes scheduling, NDI of the starting subframe in the multiple subframes scheduling, and RV of the starting subframe in the multiple subframes scheduling.

The technical solution of the present invention solves the problem of scheduling resources of multiple subframes for the relay node. As compared with the method of dynamic scheduling and semi-persistent scheduling in the prior art, the technical solution of the present invention can be more flexibly configured and can more flexibly use resources, thus ensuring the transmission of the backhaul link between the base station and the relay node.

BRIEF DESCRIPTION OF DRAWINGS

FIG. 1 is a diagram of network architecture using relay technology in the prior art;

FIG. 2 is a flowchart of RN performing service transmission in the embodiment of the present invention;

PREFERRED EMBODIMENTS OF THE PRESENT INVENTION

Figure 3:
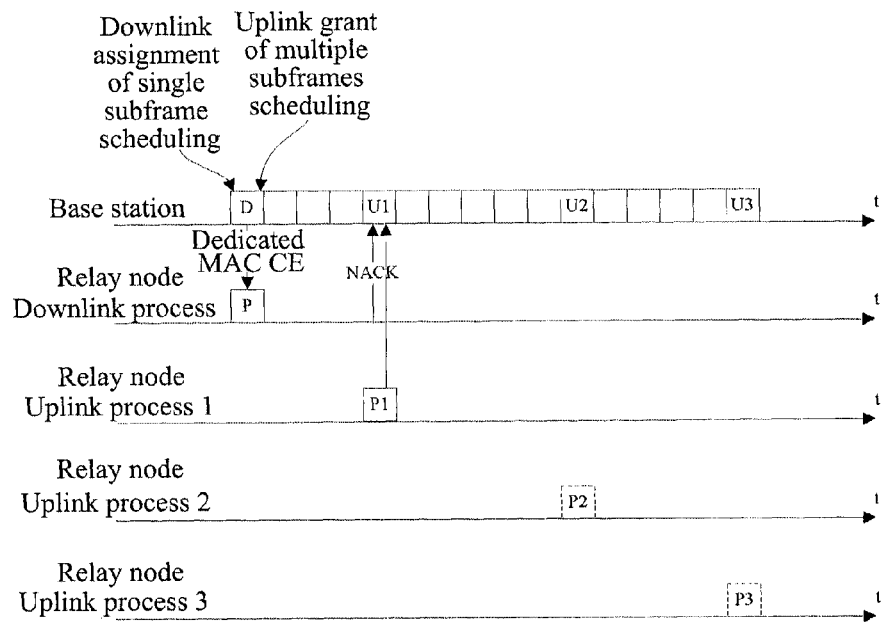
FIG. 3 is a diagram of processing the failure of reception of a dedicated MAC CE in the uplink multiple subframes scheduling.

The main concept of the present invention is that the Relay Node (RN) acquires pre-set configuration information and scheduling information of the multiple subframes scheduling, and performs multiple subframes downlink or uplink transmission according to the acquired configuration information and scheduling information.

The technical solution of the present invention will be illustrated in detail in combination with the drawings and specific embodiments hereinafter.

A RN includes an acquiring module and a transmitting module.

The acquiring module is configured to acquire the scheduling information of downlink multiple subframes scheduling and the scheduling information of uplink multiple subframes scheduling, wherein, for the specific acquiring process, see the operation of Step 202 in the specific process of RN transmitting data, which is described hereinafter;

In the present example, the acquiring module can receive downlink assignment or uplink grant on the Relay Physical Downlink Control Channel (R-PDCCH) according to Cell-Radio Network Temporal Identifier (C-RNTI) or the RNTI for multiple subframes scheduling, the downlink assignment or uplink grant may include one or more of the following scheduling information:

the number of subframes of multiple subframes scheduling, HARQ process number involved in the multiple subframes scheduling, Physical Resource Block (PRB) of each subframe, Modulation and Coding Scheme (MCS) of each subframe, and the mapping relationship between the subframes for allocating resources and the subframes for transmitting data in the multiple subframes scheduling, New Data Indicator (NDI) of each subframe and Redundancy Version (RV) of each subframe.

The acquiring module can further acquire the downlink assignment or uplink grant through a Medium Access Control (MAC) Control Element (CE), the downlink assignment or uplink grant may include one or more of the scheduling information:

the number of subframes of multiple subframes scheduling, HARQ process number involved in the multiple subframes scheduling, PRB occupied by each subframe, MCS of each subframe, and the mapping relationship between the subframes for allocating resources and the subframes for transmitting data in the multiple subframes scheduling, NDI of each subframe and RV of each subframe.

The acquiring module can further acquire the RNTI for multiple subframes scheduling through a dedicated RRC signaling, and then receive the downlink assignment or uplink grant on the R-PDCCH according to the RNTI for the multiple subframes scheduling, the downlink assignment comprises the following scheduling information:

PRB of the starting subframe in the multiple subframes scheduling, MCS of the starting subframe in the multiple subframes scheduling, NDI of the starting subframe in the multiple subframes scheduling, RV of the starting subframe in the multiple subframes scheduling, and HARQ process number of the starting subframe in the multiple subframes scheduling;

The uplink grant comprises the following scheduling information:

PRB of the starting subframe in the multiple subframes scheduling, MCS of the starting subframe in the multiple subframes scheduling, NDI of the starting subframe in the multiple subframes scheduling and RV of the starting subframe in the multiple subframes scheduling.

The transmitting module is configured to receive data on multiple continuous or discontinuous downlink backhaul subframes indicated by the scheduling information of downlink multiple subframes scheduling, and send data on multiple continuous or discontinuous uplink backhaul subframes indicated by the scheduling information of downlink multiple subframes scheduling, wherein, for the specific implementation of the transmitting module, see the operation of Step 203 in the specific process of RN transmitting data, which is described hereinafter.

The above specific process of the RN transmitting data will be described hereinafter, as shown in FIG. 2, which comprises the following steps:

Step 201: the RN acquiring the configuration information of multiple subframes scheduling, wherein the configuration information of multiple subframes scheduling at least includes the configuration information of downlink backhaul subframes and the configuration information of uplink backhaul subframes;

In the step, RN can acquire the configuration information of the downlink backhaul subframes through the RRC signaling sent by the base station or system information;

The RN can acquire the configuration information of the uplink backhaul subframes through the system information or RRC signaling sent by the base station; or on the premise of already acquiring the configuration information of the downlink backhaul subframes, the RN can then acquire the configuration information of the uplink backhaul subframes according to the configuration information of the downlink backhaul subframes based on the system predefined rules. For example, if the RN has acquired the configuration information of the downlink backhaul subframes, the RN can acquire the configuration information of the uplink backhaul subframes according to the HARQ timing in the prior art, and in particular, the subframes 4 ms later than the downlink backhaul subframes are the uplink backhaul subframes in the FDD;

In other examples, the configuration information of the multiple subframes scheduling can further comprise Relay HARQ timing, which refers to the time relationship between the timing of allocating resources, the timing of transmitting data, and the timing of feeding back, wherein the HARQ timing of the downlink multiple subframes scheduling comprises which downlink backhaul subframes the downlink resources allocated on the downlink backhaul subframes are used for, which uplink subframes whether the downlink data transmission is correct is fed back on, and the HARQ timing of the uplink multiple subframes scheduling comprises which uplink backhaul subframes the uplink resources allocated on the downlink backhaul subframes are used for, which downlink subframes whether the uplink data transmission is correctly fed back on. The Relay HARQ timing certainly can also be system predefined. In addition, in some examples, the configuration information of the multiple subframes scheduling further comprises the corresponding relationship between the subframes and the processes, i.e., which process the uplink or downlink transmission by each subframe occupies. The corresponding relationship between the subframes and the processes certainly can also be system predefined.

Before the base station uses the scheduling method of the present invention to schedule the RN, the RN has known the configuration information of the Un subframes (i.e., which subframes are the Un subframes) and the HARQ timing.

Step 202: the RN acquiring the scheduling information of multiple subframes scheduling, wherein the scheduling information of multiple subframes scheduling includes subframe information of the multiple subframes scheduling (commonly indicated by a starting subframe and the number of the subframes, or indicated by a bitmap) and PRB, MCS and HARQ information occupied by each scheduling subframe, and the HARQ information includes HARQ process identification (process id), NDI, RV etc., wherein multiple subframes in the multiple subframes scheduling are continuous or discontinuous multiple subframes;

In the step, the scheduling information of the multiple subframes scheduling can be indicated to the RN by the RRC signaling sent by the base station, MAC CE, or the DCI separately, or can be indicated to the RN by the RRC signaling and MAC CE jointly, and can also be indicated to the RN by the RRC signaling and DCI jointly. When it is indicated by the RRC signaling and MAC CE jointly, if there is scheduling information commonly indicated by the both (for example, both the RRC signaling and MAC CE indicate the number of subframes of the multiple subframes scheduling), the scheduling information indicated by the MAC CE shall prevail; when it is indicated by the RRC signaling and DCI jointly, if there is scheduling information commonly indicated by the both (for example, both the RRC signaling and DCI indicate the number of subframes of the multiple subframes scheduling), the scheduling information indicated by the DCI shall prevail; and when the scheduling information of the multiple subframes scheduling is indicated to the RN by the RRC signaling separately (i.e., both the downlink assignment or uplink grant uses existing DCI format, and no MAC CE indicates the scheduling information of the multiple subframes scheduling), the RRC signaling must include multiple subframes scheduling dedicated RNTI.

For the purpose of the description hereinafter, the RRC signaling for transferring the scheduling information of the multiple subframes scheduling is referred to as dedicated RRC signaling, the MAC CE for transferring the scheduling information of the multiple subframes scheduling is referred to as dedicated MAC CE, and the DCI for transferring the scheduling information of the multiple subframes scheduling is referred to as dedicated DCI.

Specifically, the RN can acquire one or more of the following the scheduling information of the multiple subframes scheduling through the dedicated RRC signaling sent by the base station, wherein the dedicated RRC signaling is the existing RRC signaling (such as RRC connection reconfiguration message) with added fields for indicating the scheduling information of the multiple subframes scheduling, or the dedicated RRC which is newly introduced for transferring the scheduling information of the multiple subframes scheduling:

(1) the number of subframes of the multiple subframes scheduling, and the value of the number of the subframes is a positive integer greater than or equal to 1, and the default value is 1, which means single subframe scheduling, wherein the RN can respectively acquire the number of subframes of downlink multiple subframes scheduling and the number of subframes of uplink multiple subframes scheduling from the dedicated RRC signaling. The RN certainly can also acquire single value of the number of subframes from the dedicated RRC signaling, and at this time, it is indicated that the number of the subframes of the downlink multiple subframes scheduling is the same as the number of the subframes of the uplink multiple subframes scheduling;

(2) Multiple subframes scheduling dedicated RNTI (Radio Network Temporal Identification), wherein the downlink multiple subframes scheduling dedicated RNTI and the uplink multiple subframes scheduling dedicated RNTI can be the same, or can also be different;

(3) the multiple subframes scheduling HARQ timing, wherein the HARQ timing in the downlink multiple subframes scheduling at least includes the mapping relationship between the downlink backhaul subframes on which the downlink assignment of the downlink multiple subframes scheduling is received by the RN and the downlink backhaul subframes on which the downlink data of the downlink multiple subframes scheduling is received by the RN. And on that basis, the HARQ timing can further comprise the mapping relationship between the downlink backhaul subframes on which the downlink data of the downlink subframes scheduling is received by the RN and the uplink backhaul subframes on which whether the downlink data of the downlink subframes scheduling is successful is fed back by the RN; and the HARQ timing in the uplink multiple subframes scheduling at least includes the mapping relationship between the downlink backhaul subframes on which the uplink grant of the uplink multiple subframes scheduling is received by the RN and the uplink backhaul subframes on which the uplink data of the uplink multiple subframes scheduling is sent by the RN. And on that basis, the HARQ timing can further comprise the mapping relationship between the uplink backhaul subframes on which the uplink data of the uplink subframes scheduling is sent by the RN and the downlink backhaul subframes on which the feedback that whether the uplink data of the uplink subframes scheduling is sent successfully is received by the RN.

The RN can acquire one or more of the following scheduling information through the dedicated MAC Control Element (MAC CE), wherein the dedicated MAC CE is an introduced new MAC CE for transferring the scheduling information of the multiple subframes scheduling. The dedicated MAC CEs for the scheduling information of the downlink and uplink multiple subframes scheduling can be different dedicated MAC CEs or can be the same dedicated MAC CEs. When the same dedicated MAC CE is used, the dedicated MAC CE includes one flag bit, which is used to indicate whether the scheduling information of downlink multiple subframes scheduling or the scheduling information of uplink multiple subframes scheduling is transferred:

(1) the number of subframes of the multiple subframes scheduling, and the value of the number of the subframes is a positive integer greater than or equal to 1, and the default value is 1, which means single subframe scheduling, wherein the RN can respectively acquire the number of subframes of downlink multiple subframes scheduling and the number of subframes of uplink multiple subframes scheduling. The RN certainly can also acquire single value of the number of subframes, and at this time, it is indicated that the number of the subframes of the downlink multiple subframes scheduling is the same as the number of the subframes of the uplink multiple subframes scheduling;

(2) HARQ process number involved in the multiple subframes scheduling, which can only indicate the HARQ process number to which the starting subframe corresponds, and the HARQ process number to which the subsequent subframes correspond can be acquired according to the HARQ process number to which the starting subframe corresponds and a set algorithm (for example, increasing in turn); and can also indicate the HARQ process number of each subframe in the multiple subframes scheduling;

(3) PRBs occupied by the multiple subframe scheduling, which can only indicate the PRB occupied by the starting subframe, and at this time, the PRBs occupied by the subsequent subframes are considered to be the same as that occupied by the starting subframe, and which can also respectively indicate the PRB occupied by each subframe in the multiple subframes scheduling;

(4) the MCSs of the multiple subframes scheduling, which can only indicate the MCS of the starting subframe, and at this time, the MCSs of the subsequent subframes are considered to be the same as that of the starting subframe, and can also respectively indicate the MCS of each subframe in the multiple subframes scheduling;

(5) the mapping relationship between the subframes for allocating resources and the subframes for transmitting in the multiple subframes scheduling, which describes the subframes of which the fields are scheduled by means of bitmap. For example, the HARQ timing of the multiple subframes scheduling acquired through the RRC signaling by the RN represents that the uplink grant received on the downlink backhaul subframe D is used to perform uplink transmission on the uplink backhaul subframes U1, U2 and U3. If the RN receives the uplink grant on the subframe D of which the field is indicated by bitmap "110", it means the uplink grant is used for the uplink transmission of two uplink subframes, i.e., U1 and U2. The scheduling information is particularly suitable for discontinuous multiple subframes scheduling.

The RN considers that the transmission of the MAC CE is a first transmission in the process of receiving the MAC PDU including the above dedicated MAC CE. Thus, when the RN fails to receive the MAC CE, the base station needs not to retransmit, because the retransmission of the MAC CE may occupy the subframes of the multiple subframes scheduling indicated by the MAC CE, making the MAC CEs which are successfully retransmitted lack in timeliness, i.e., the RN has missed the subframes indicated in the MAC CEs by the DeNB.

The RN can acquire one or more of the following scheduling information of the multiple subframes scheduling through the dedicated DCI, wherein the dedicated DCI can be implemented by adding the fields indicating the scheduling information of the multiple subframes scheduling in the existing DCI (for example, the uplink uses DCI format 0, and the downlink uses DCI format 1), and can also be implemented by using newly defined DCI format for transferring the scheduling information of the multiple subframes scheduling. The DCIs indicating the scheduling information of the downlink and uplink multiple subframes scheduling can be different DCIs, and can also be the same DCI. When the same DCI is used, the DCI includes one flag bit, which is used to indicate whether the scheduling information of downlink multiple subframes scheduling or the scheduling information of uplink multiple subframes scheduling is transferred:

(1) The flag bit of the multiple subframes scheduling. When the scheduling information of the multiple subframes scheduling is indicated by the DCI alone, if the other fields of the DCI are the same as the fields of the existing DCI, the RN determines whether the resources indicated by the DCI are used for the multiple subframes scheduling or single subframe scheduling according to the flag bit;

(2) The number of subframes of the multiple subframes scheduling, and the value of the number of the subframes is a positive integer greater than or equal to 1, and the default value is 1, which means single subframe scheduling, wherein the RN can respectively acquire the number of subframes of downlink multiple subframes scheduling and the number of subframes of uplink multiple subframes scheduling. The RN certainly can also only acquire single value of the number of subframes, and at this time, it is indicated that the number of the subframes of the downlink multiple subframes scheduling is the same as the number of the subframes of the uplink multiple subframes scheduling;

(3) HARQ process number involved in the multiple subframes scheduling, which can only indicate the HARQ process number to which the starting subframe corresponds, and the HARQ process number to which the subsequent subframes correspond can be acquired according to the HARQ process number to which the starting subframe corresponds and a set algorithm (for example, increasing in turn); and can also indicate the HARQ process number of each subframe in the multiple subframes scheduling;

(4) PRBs occupied by the multiple subframe scheduling, which can only indicate the PRB occupied by the starting subframe, and at this time, the PRBs occupied by the subsequent subframes are considered to be the same as that occupied by the starting subframe, and can also respectively indicate the PRB occupied by each subframe in the multiple subframes scheduling;

(5) the MCSs of the multiple subframes scheduling, which can only indicate the MCS of the starting subframe, and at this time, the MCSs of the subsequent subframes are considered to be the same as that of the starting subframe, and can also respectively indicate the MCS of each subframe in the multiple subframes scheduling;

(6) the mapping relationship between the subframes for allocating resources and the subframes for transmitting in the multiple subframes scheduling, which describes the subframes of which the fields are scheduled by means of bitmap. For example, the HARQ timing of the multiple subframes scheduling acquired through the RRC signaling by the RN represents that the uplink grant received on the downlink backhaul subframe D is used to perform uplink transmission on the uplink backhaul subframes U1, U2 and U3. If the RN receives the uplink grant on the subframe D of which the field is indicated by bitmap "110", it means the uplink grant is used for the uplink transmission of two uplink subframes, i.e., U1 and U2. The scheduling information is particularly suitable for discontinuous multiple subframes scheduling.

Step 203: the RN determining the downlink assignment or uplink grant, so as to receive downlink data or send uplink data;

As the multiple subframes scheduling refers to scheduling HARQ first transmission of multiple continuous or discontinuous backhaul subframes, in order to achieve multiple subframes scheduling, the RN acquires the scheduling information of the multiple subframes scheduling in step 202, i.e., the subframe information of one scheduling.

Wherein, the starting subframe in the subframe information of one scheduling of the multiple subframes scheduling can be a subframe commonly indicated by a subframe on which the downlink assignment or uplink grant is acquired by the RN and existing HARQ timing (for example, the downlink starting subframe is a subframe on which the downlink assignment of the multiple subframes scheduling is acquired by the RN; in the FDD mode, the uplink starting subframe is the subframe 4 ms later than that on which the uplink grant of the multiple subframes scheduling is received by the RN; in the TDD mode, the uplink starting subframe is related to the specific TDD configuration); can also be the subframe commonly indicated by a subframe on which the downlink assignment or uplink grant of the multiple subframes scheduling is received by the RN and the Relay HARQ timing (the Relay HARQ timing can be system predefined, and can also be transferred in the configuration information of the multiple subframes scheduling by the base station, and can also be transferred in scheduling information of the multiple subframes scheduling). Particularly, when the scheduling information of the multiple subframes scheduling is indicated by the dedicated MAC CE, the starting subframe can also be a subframe commonly indicated by the subframe on which the dedicated MAC CE is sent and the system predefined time interval, or can also be the first downlink or uplink backhaul subframe following the subframe on which the dedicated MAC CE is correctly received.

The number of the subframes in the subframe information of one scheduling can be a system predefined value, or be obtained by the RN through the dedicated RRC signaling, dedicated MAC CE or dedicated DCI. The RN certainly can indirectly acquire the number of the subframes according to the number of the processes, the number of the PRBs or the number of the MCSs in the dedicated MAC CE or dedicated DCI, i.e., the number of the subframes of the multiple subframes scheduling is the same as the number of the processes, the number of the PRBs and the number of the MCSs.

The indication of the bitmap in the subframe information of one scheduling refers to which subframes are scheduled in the discontinuous multiple subframes scheduling, determined by the RN using the mapping relationship between the subframes for allocating resources and the subframes for transmitting in the multiple subframes scheduling in combination with the HARQ timing of the multiple subframes scheduling, wherein the HARQ timing of the multiple subframes scheduling is acquired through the RRC signaling, and the mapping relationship is acquired through the MAC CE or the DCI. For example, when the HARQ timing of the multiple subframes scheduling is acquired through the RRC signaling by the RN, if the RRC signaling represents that the uplink grant received on the downlink backhaul subframe D is used for the uplink transmission of the uplink backhaul subframes U1, U2 and U3, the RN receives the uplink grant on the subframe D, wherein the field indicating the mapping relationship in the DCI indicates the subframes scheduled in this multiple subframes scheduling in bitmap "110", which means that the uplink grant is used for the uplink transmission of two uplink subframes, i.e., U1 and U2.

The PRB (or MCS) occupied by each subframe can be obtained through dedicated MAC CE or dedicated DCI; and if dedicated MAC CE or dedicated DCI includes PRBs (or MCSs) for multiple subframes, each subframe uses different PRB (or MCS). If the dedicated MAC CE or DCI only includes PRB (or MCS) for one subframe, each subframe uses the same PRB (or MCS).

For the HARQ process id in the HARQ information of each subframe, the corresponding relationship between the subframes and the HARQ process id can be acquired through the system pre-definition or RRC signaling, and accordingly the HARQ process id (i.e., synchronic HARQ) occupied by the subframe is acquired according to the subframe number, or is acquired through the dedicated MAC CE or DCI. The dedicated MAC CE is implemented by introducing new MAC CE for transferring the HARQ process id. The DCI can be the existing DCI (for example, the uplink uses DCI format 0, and the downlink uses DCI format 1), and can also be dedicated DCI. The dedicated DCI is implemented by introducing new DCI format for transferring HARQ process id. If the dedicated MAC CE or DCI includes the HARQ process ids for the multiple subframes, each subframe uses corresponding HARQ process id in turn. If the dedicated MAC CE or DCI only includes HARQ process id for one subframe, i.e., only the HARQ process id occupied by the starting subframe is provided, the HARQ process id occupied by the subsequent subframes can be acquired by increasing the HARQ process id occupied by the starting subframe in turn.

The NDI in the HARQ information of each subframe is used to be compared with the last received NDI to determine whether the NDI is changed, so as to determine whether the currently received process is the first transmission or retransmission. For the multiple subframes scheduling, each process is the first transmission, and therefore, there is no need to determine according to the NDI. However, in order to subsequently determine whether the single subframe scheduling is a first transmission or retransmission according to the comparison of the NDIs, the NDI for the multiple subframes scheduling is predefined. In the subsequently received DCIs indicating single subframe scheduling, if the value of the NDI is the same as the value of the predefined NDI for the multiple subframe scheduling, it is suggested that the single subframe scheduling is a retransmission; otherwise, if the values of the NDIs are different, it is suggested that the single subframe scheduling is a first transmission.

The RV in the HARQ information of each subframe is a redundancy version of the downlink or uplink transmission; and for the first transmission, the redundancy version is the zeroth version. No matter which version of the RV is indicated in the received DCI, the transmission of the multiple subframes scheduling is the zero version by default.

The RN receives downlink data or sends uplink data on the corresponding subframes according to the above scheduling information.

In the above process, during the determination of the downlink assignment or uplink grant by the RN, the scheduling information acquired in Step 202 is kept until the multiple subframes scheduling ends.

The detailed process of the RN determining the downlink assignment to receive the downlink data and determining the uplink grant to send the uplink data will be illustrated in combination with the actual application scenario.

For example, the scheduling information of the multiple subframes scheduling is indicated to the RN through the dedicated RRC signaling separately, and when the dedicated RRC signaling has configured multiple subframes scheduling dedicated RNTI (in the present example, the uplink and downlink use the same dedicated RNTI) and the system pre-definition or the dedicated RRC signaling has configured the number of subframes (in the present example, 3 for example), the RN detects R-PDCCH on each downlink backhaul subframe using dedicated RNTI indicated by the dedicated RRC signaling. And if the RN detects the downlink assignment (DCI format 1) on subframe D1 and the downlink assignment indicates the process id (in the present example, process 1 for example) of the starting subframe, PRB and MCS, without considering the retransmission, the RN receives downlink data on the D1 and subsequent two downlink backhaul subframes D2 and D3 according to the PRB, MCS in the downlink assignment, and process 1, process 2 (or the process to which D2 corresponds, as the system predefined) and process 3 (or the process to which D3 corresponds, as the system predefined) are treated as first transmission. If the RN detects the uplink grant (DCI format 0) on the subframe D1 and the uplink grant indicates the PRB, MCS of the starting frame, without considering the retransmission, the RN sends uplink data on the next three uplink backhaul subframes U1, U2 and U3 according to the PRB, MCS in the uplink grant, and the process to which U1 corresponds as the system predefined (in the present example, process 1 for example), process 2 (or the process to which U2 corresponds, as the system defined) and process 3 (or the process to which U3 corresponds, as the system defined) are treated as first transmission.

It can be seen from the above description that after the RN correctly receives the dedicated RRC signaling of the same multiple subframes scheduling dedicated RNTI used by the uplink and downlink, the downlink assignment or uplink grant indicated by the dedicated RNTI on the R-PDCCH is the downlink assignment or uplink grant for the multiple subframes scheduling; after the RN correctly receives the RRC signaling including the downlink multiple subframes scheduling dedicated RNTI, the downlink assignment indicated by the RNTI on the R-PDCCH is the downlink assignment for the multiple subframes scheduling; and after the RN correctly receives the RRC signaling including the uplink multiple subframes scheduling dedicated RNTI, the uplink assignment indicated by the RNTI on the R-PDCCH is the uplink assignment for the multiple subframes scheduling.

As an another example, the scheduling information of the multiple subframes scheduling is indicated to the RN by the dedicated DCI format alone, or is commonly indicated to the RN by the dedicated DCI format in combination with dedicated RRC signaling. When the system pre-definition or dedicated RRC signaling has configured the number of the subframes (in the example, 3 for example), the RN detects the R-PDCCH on each downlink backhaul subframe using the C-RNTI, and if the RN detects the downlink assignment (dedicated DCI) on subframe D1 and the flag bit, process (in the present example, process 1 for example), PRB, MCS of the starting subframe are indicated in the downlink assignment, without considering the retransmission, the RN receives downlink data on the D1 and subsequent two downlink backhaul subframes D2 and D3 according to the PRB, MCS in the downlink assignment, and process 1, process 2 (or the process to which D2 corresponds, as the system predefined) and process 3 (or the process to which D3 corresponds, as the system predefined) are treated as first transmission; when the number of subframes, process, PRB and MCS of each subframe are also indicated in the downlink assignment (dedicated DCI), the multiple and single subframe scheduling can be distinguished without the flag bit; if the RN detects the uplink grant (dedicated DCI) on the subframe D1 and the uplink grant indicates the flag bit, PRB, MCS of the starting frame, without considering the retransmission, the RN sends uplink data on the next three uplink backhaul subframes U1, U2 and U3 according to the PRB, MCS in the uplink grant, and the process to which U1 corresponds as the system predefined (in the present example, process 1 for example), process 2 (or the process to which D2 corresponds, as the system defined) and process 3 (or the process to which U3 corresponds, as the system defined) are treated as first transmission; when the number of subframes, process, PRB and MCS of each subframe are also indicated in the uplink grant (dedicated DCI), the multiple and single subframe scheduling can be distinguished without the flag bit.

In addition, the dedicated DCI format further indicates the discontinuous multiple subframes scheduling to the RN, and when the system pre-definition or dedicated RRC signaling has configured the number of subframes (3 for example), and the dedicated RRC signaling has configured HARQ timing of the multiple subframes scheduling (for example, the downlink assignment of the downlink backhaul subframe D1 can be used to indicate the downlink transmission of three downlink backhaul subframes D1, D2 and D3), the RN detects R-PDCCH on each downlink backhaul subframe using the C-RNTI. And if the RN detects the downlink assignment (dedicated DCI) on D1 and the downlink assignment indicates the flag bit, process (process 1 for example), PRB, MCS of the starting subframe and indicates the subframe of the multiple subframes scheduling (by means of bitmap "101"), without considering the retransmission, the RN receives downlink data on the D1 and D3 according to the PRB, MCS in the downlink assignment, and process 1, process 2 (or the process to which D3 corresponds, as the system predefined) are treated as first transmission. At this time, as the downlink backhaul subframe D2 between D1 and D3 is not indicated in the subframe of the multiple subframes scheduling, D2 is not involved in the multiple subframes scheduling. Other processing modes are similar to the continuous multiple frames scheduling, and therefore, will not be repeatedly described here.

As an another example, when the multiple subframes scheduling is indicated to the RN by the dedicated MAC CE alone, or is commonly indicated to the RN by the dedicated MAC CE in combination with dedicated RRC signaling and the system pre-definition or dedicated RRC signaling has configured the number of the subframes (in the example, 3 for example), the RN detects the R-PDCCH on each downlink backhaul subframe using the C-RNTI. And if the RN detects the downlink assignment (DCI format 1) on subframe D1, without considering the retransmission, the RN correctly receives on the D1 the MAC PDU which includes dedicated MAC CE according to the indication of the downlink assignment (DCI format 1), and the dedicated MAC CE indicates the process (in the present example, process 1 for example), PRB, MCS of the starting subframe and indicates in the flag bit that it is used for the downlink multiple subframes scheduling. And the RN receives downlink data on the subsequent three downlink backhaul subframes D2, D3 and D4 according to the PRB, MCS in the dedicated MAC CE, and process 1 (or the process to which D2 corresponds, as the system predefined), process 2 (or the process to which D3 corresponds, as the system predefined) and process 3 (or the process to which D4 corresponds, as the system predefined) are treated as first transmission; the number of subframes, process, PRB and MCS of each subframe can also be indicated in the dedicated MAC CE; if the RN detects the downlink assignment (DCI format 1) on subframe D1, without considering the retransmission, the RN correctly receives on the D1 the MAC PDU which includes dedicated MAC CE indicating PRB, MCS of the starting subframe according to the indication of the downlink assignment (DCI format 1) and indicates in the flag bit that it is used for the uplink multiple subframes scheduling. The RN then sends uplink data on the subsequent three uplink backhaul subframes U1, U2 and U3 according to the PRB, MCS in the dedicated MAC CE, and process 1 to which U1 corresponds as the system predefined (process 1 for example), process 2 (or the process to which U2 corresponds, as the system predefined) and process 3 (or the process to which U3 corresponds, as the system predefined) are treated as first transmission; the number of subframes, process, PRB and MCS of each subframe can also be indicated in the dedicated MAC CE.

In other examples, in the process of the RN receiving the dedicated MAC CE including the uplink multiple subframes scheduling, if the reception fails, it means that the present multiple subframes scheduling fails. As shown in FIG. 3, D represents downlink backhaul subframes, Ux represents the x uplink backhaul subframe in the uplink multiple subframes scheduling, DeNB allocates downlink assignment and uplink grant to the RN on the subframe D; according to the normal process, the RN needs to receive MAC PDU which includes the dedicated MAC CE indicating the uplink multiple subframes scheduling according to the downlink assignment, and reserves the uplink grant, wherein the dedicated MAC CE indicates that the RN respectively schedules process 1, process 2 and process 3 on subframes U1, U2 and U3, and the uplink grant indicates the scheduling information such as PRB, MCS etc. used by the RN scheduling process 1 on subframe U1, and the RN sends the data of the first subframe (process 1) of the multiple subframes scheduling on subframe U1 according to the uplink grant, and meanwhile, whether the MAC PDU including the above dedicated MAC CE is successfully received is fed back by the RN on the subframe. However, when the RN fails to receive the MAC PDU including the above MAC CE, the RN cannot acquire the uplink multiple subframes scheduling information in the MAC CE, the RN does not perform multiple subframes scheduling subsequently. Thus, the DeNB receives the NACK (representing that the RN fails to receive) fed back on the subframe U1 and learns that the RN does not acquire the uplink multiple subframes scheduling information, and therefore, the present multiple subframes scheduling fails, and the DeNB can retransmit the MAC CE indicating the multiple subframes scheduling on the subsequent downlink backhaul subframes.

Figure 4:
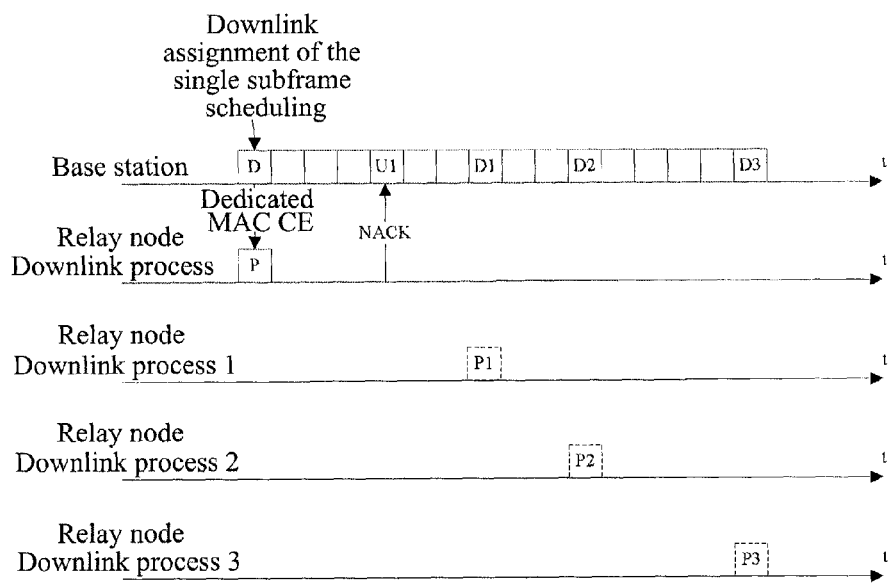
FIG. 4 is a diagram of processing the failure of reception of a dedicated MAC CE in the downlink multiple subframes scheduling.

In some other examples, when the RN receives dedicated MAC CE of the downlink subframes scheduling, if the reception fails, the specific process thereof is shown in FIG. 4, wherein. Dx represents the x downlink backhaul subframe in the downlink multiple subframes scheduling. The DeNB allocates downlink assignment to the RN on subframe D, with the downlink assignment using existing DCI format 1. According to the normal process, the RN needs to receive MAC PDU including the dedicated MAC CE on subframe D according to the indication of the downlink assignment, wherein the dedicated MAC CE indicates that the RN respectively schedules process 1, process 2 and process 3 on subframes D1, D2 and D3, and includes the corresponding scheduling information such as PRB, MCS etc., and whether the MAC PDU is successfully received is fed back by the RN on the corresponding uplink backhaul subframe; however, when the RN fails to receive the MAC PDU including the dedicated MAC CE, the RN cannot acquire the downlink multiple subframes scheduling information in the MAC CE, the RN does not perform multiple subframes scheduling subsequently. The DeNB receives the NACK fed back (representing that the RN fails to receive) and learns that the RN does not acquire the downlink multiple subframes scheduling information, and therefore, the present multiple subframes scheduling fails, and the DeNB can retransmit the MAC CE indicating the multiple subframes scheduling on the subsequent downlink backhaul subframes.

Step 204: the RN sending or receiving the HARQ feedback of each subframe in the multiple subframes scheduling.

In the step, the RN can separately perform feedback for each subframe in the multiple subframes scheduling according to the prior art, and can also commonly perform feedback for multiple subframes with reference to the ACK or NACK bundling mode in the existing TDD.

In the above process, the dedicated RRC signaling is dedicated signaling for the specified UE or the specified RN, and the dedicated RRC signaling used to acquire the scheduling information of the multiple subframes scheduling is implemented by adding the fields indicating the scheduling information of the multiple subframes scheduling in the existing RRC signaling (for example, RRC configuration message) or introducing new RRC signaling for transferring the scheduling information of the multiple subframes scheduling. And the scheduling information of the multiple subframes scheduling, the downlink backhaul subframe configuration information and uplink backhaul subframe configuration information can be transmitted by the same dedicated RRC signaling or multiple different dedicated RRC signaling.

The above is only the description of the preferred embodiments of the present invention and is not intended to limit the present invention. There may be a plurality of other embodiments in the present invention. Various corresponding modifications and variations can be made by those skilled in the art according to the present invention without departing from the spirit and substance of the present invention, and all these corresponding modifications and variations should fall in the protection scope of appending claims of the present invention.

INDUSTRIAL APPLICABILITY

The relay node and the method thereof for transmitting data provided by the present invention solve the problem of scheduling resources of multiple subframes for the relay node. As compared with the method of dynamic scheduling and semi-persistent scheduling in the prior art, the technical solution of the present invention can be more flexibly configured and can more flexibly use resources, thus ensuring the transmission of the backhaul link between the base station and the relay node.

What we claim is:

1. A method for a Relay Node (RN) transmitting data, comprises:

the RN acquiring scheduling information of multiple subframes scheduling, wherein the scheduling information of multiple subframes scheduling includes scheduling information of downlink multiple subframes scheduling and scheduling information of uplink multiple subframes scheduling;

the RN receiving data on multiple corresponding continuous or discontinuous downlink backhaul subframes according to the scheduling information of downlink multiple subframes scheduling, and/or the RN sending data on multiple corresponding continuous or discontinuous uplink backhaul subframes according to the scheduling information of uplink multiple subframes scheduling;

wherein, the RN acquiring the scheduling information of multiple subframes scheduling comprises:

the RN acquiring a downlink assignment or uplink grant through a Medium Access Control (MAC) Control Element (CE), with the downlink assignment or uplink grant including the scheduling information of multiple subframes scheduling;

wherein, the RN acquires the downlink assignment and uplink grant through the same MAC CE, or acquires the downlink assignment and uplink grant through different MAC CEs; and when the RN acquires the downlink assignment and uplink grant through the same MAC CE, flag bits are added in the same MAC CE to represent whether the same MAC CE indicates downlink assignment for downlink multiple subframes scheduling or uplink grant for uplink multiple subframes scheduling.

2. The method according to claim 1, wherein, the data received on the multiple corresponding continuous or discontinuous downlink backhaul subframes by the RN is Hybrid Automatic Retransmission Request (HARQ) first transmission, and the data sent on the multiple corresponding continuous or discontinuous uplink backhaul subframes by the RN is HARQ first transmission.

3. The method according to claim 1, wherein, the RN acquiring the scheduling information of multiple subframes scheduling comprises:

the RN receiving downlink assignment or uplink grant on a Relay Physical Downlink Control Channel (R-PDCCH) according to Cell-Radio Network Temporal Identifier (C-RNTI) or a RNTI for multiple subframes scheduling, with the downlink assignment or uplink grant including the scheduling information of multiple subframes scheduling.

4. The method according to claim 3, wherein, the downlink assignment and the uplink grant are indicated to the RN by the same Downlink Control Information (DCI) for the multiple subframes scheduling, or the downlink assignment and the uplink grant are indicated by different DCIs for the multiple subframes scheduling respectively; and when the downlink assignment and the uplink grant are indicated by the same DCI for the multiple subframes scheduling, flag bits are added in the DCI for multiple subframes scheduling to represent whether the same DCI indicates the downlink assignment for downlink multiple subframes scheduling or uplink grant for uplink multiple subframes scheduling.

5. The method according to claim 3, wherein, a starting subframe in the multiple subframes scheduling is a subframe commonly indicated by a subframe on which the downlink assignment or uplink grant is received by the RN and Hybrid Automatic Retransmission Request (HARQ) timing; or a starting subframe in the multiple subframes scheduling is a subframe commonly indicated by a subframe on which the downlink assignment or uplink grant is received by the RN and the Relay HARQ timing; or a starting subframe in the multiple subframes scheduling is a subframe commonly indicated by a Relay HARQ timing and a mapping relationship between a subframe for the allocating resources and a subframe for transmitting data;

wherein the RN acquires the Relay HARQ timing through system pre-definition or Radio Resource Control (RRC) signaling.

6. The method according to claim 3, further comprises:

when the downlink assignment or uplink grant does not include a number of subframes of the multiple subframes scheduling, the RN acquiring the number of subframes of the multiple subframes scheduling through system pre-definition or Radio Resource Control (RRC) signaling before receiving the downlink assignment or uplink grant;

when the downlink assignment or uplink grant does not include a HARQ process number involved in the multiple subframes scheduling, the RN acquiring a HARQ process number of a starting subframe and a HARQ process number of subsequent subframes of the multiple subframes scheduling through the system pre-definition or a corresponding relationship between a subframe and a HARQ process number in RRC signaling, or acquiring the HARQ process number of the starting subframe of the multiple subframes scheduling through the system pre-definition or RRC signaling, and increasing the HARQ process number of the starting subframe in turn to acquire the HARQ process number of the subsequent subframes;

when the downlink assignment or uplink grant only includes one Physical Resource Block (PRB), the RN learning that each subframe in the multiple subframes scheduling occupies the same PRB;

when the downlink assignment or uplink grant only includes one Modulation and Coding Scheme (MCS), the RN learning that each subframe in the multiple subframes scheduling uses the same MCS;

when the downlink assignment or uplink grant does not include a New Data Identifier (NDI), the RN learning that a NDI of each subframe in the multiple subframes scheduling is a default value; and when the downlink assignment or uplink grant does not include a Redundancy Version (RV), the RN learning that a RV of each subframe in the multiple subframes scheduling is a default value.

7. The method according to claim 1, wherein, the scheduling information of multiple subframes scheduling comprises one or more of the following information:

a number of subframes of the multiple subframes scheduling, Hybrid Automatic Repeat Request (HARQ) process number involved in the multiple subframes scheduling, Physical Resource Block (PRB) of each subframe, Modulation and Coding Scheme (MCS) of each subframe, a mapping relationship between subframes for allocating resources and subframes for transmitting data in the multiple subframes scheduling, New Data Indicator (NDI) of each subframe and Redundancy Version (RV) of each subframe.

8. The method according to claim 1, wherein, subsequent subframes in the multiple subframes scheduling are subframes commonly indicated by a Relay Hybrid Automatic Retransmission Request (HARQ) timing and a mapping between a subframe for allocating resources and a subframe for transmitting data; and the RN acquires the Relay HARQ timing through system pre-definition or Radio Resource Control (RRC) signaling.

9. The method according to claim 1, wherein, a starting subframe in the multiple subframes scheduling is a subframe commonly indicated by a subframe on which the RN receives the MAC CE and a system predefined time interval; or a starting subframe in the multiple subframes scheduling is a first downlink backhaul subframe or uplink backhaul subframe following a subframe on which the RN correctly receives the MAC CE.

10. The method according to claim 1, wherein, the RN acquiring the scheduling information of multiple subframes scheduling comprises:

the RN acquiring a Radio Network Temporal Identifier (RNTI) for the multiple subframes scheduling through a dedicated Radio Resource Control (RRC) signaling, and then receiving a downlink assignment or uplink grant on a Relay Physical Resource Channel (R-PDCCH) according to the RNTI for the multiple subframes scheduling, with the downlink assignment or uplink grant including the scheduling information of multiple subframes scheduling.

11. The method according to claim 10, wherein, the downlink assignment comprises the following scheduling information:

Physical Resource Block (PRB) of a starting subframe in the multiple subframes scheduling, Modulation and Coding Scheme (MCS) of the starting subframe in the multiple subframes scheduling, New Data Identifier (NDI) of the starting subframe in the multiple subframes scheduling, Redundancy Version (RV) of the starting subframe in the multiple subframes scheduling, HARQ process number of the starting subframe in the multiple subframes scheduling;

the uplink grant comprises the following scheduling information:

PRB of the starting subframe in the multiple subframes scheduling, MCS of the starting subframe in the multiple subframes scheduling, NDI of the starting subframe in the multiple subframes scheduling, RV of the starting subframe in the multiple subframes scheduling.

12. The method according to claim 10, wherein, a starting subframe in the multiple subframes scheduling is a subframe commonly indicated a subframe on which the downlink assignment or uplink grant is received by the RN and Hybrid Automatic Retransmission Request (HARQ) timing; or a starting subframe in the multiple subframes scheduling is a subframe commonly indicated by a subframe on which the downlink assignment or uplink grant is received by the RN and a Relay HARQ timing;

wherein the RN acquires the Relay HARQ timing through system pre-definition or Radio Resource Control (RRC) signaling.

13. The method according to claim 10, further comprises:
when acquiring a Physical Resource Block (PRB) of a starting subframe in the multiple subframes scheduling from the downlink assignment or uplink grant, the RN learning that PRBs of the subsequent subframes in the multiple subframes scheduling are the same as the PRB of the starting subframe; and
when acquiring a Modulation and Coding Scheme (MCS) of the starting subframe in the multiple subframes scheduling from the downlink assignment or uplink grant, the RN learning that MCSs of the subsequent subframes in the multiple subframes scheduling are the same as the MCS of the starting subframe.

14. The method according to claim 10, further comprises:
the RN acquiring a number of subframes of the multiple subframes scheduling through system pre-definition or RRC signaling before receiving the downlink assignment or uplink grant;
the RN learning that a New Data Identifiers (NDIs) of a subsequent subframes in the multiple subframes scheduling have the same value as that of a NDI of a starting subframe, or the RN learning that the NDIs of the subsequent subframes in the multiple subframes scheduling are default values; and
the RN learning that a Redundancy Versions (RVs) of the subsequent subframes in the multiple subframes scheduling have the same value as that of a RV of the starting subframe, or the RN learning that the RVs of the subsequent subframes in the multiple subframes scheduling are default values.

15. The method according to claim 10, further comprises:
the RN acquiring a corresponding relationship between a subframe and a HARQ process number through a system pre-definition or RRC signaling to acquire a HARQ process number of a subsequent subframes in the multiple subframes scheduling, or
the RN increasing a HARQ process number of a starting subframe in turn to acquire the HARQ process number of the subsequent subframes in the multiple subframes scheduling.

16. The method according to claim 1, further comprises:
when the downlink assignment or uplink grant does not include a number of subframes of the multiple subframes scheduling, the RN acquiring the number of subframes of the multiple subframes scheduling through system pre-definition or Radio Resource Control (RRC) signaling before receiving the downlink assignment or uplink grant;
when the downlink assignment or uplink grant does not include a HARQ process number involved in the multiple subframes scheduling, the RN acquiring a HARQ process number of a starting subframe and a HARQ process number of subsequent subframes of the multiple subframes scheduling through the system pre-definition or a corresponding relationship between a subframe and a HARQ process number in RRC signaling, or acquiring the HARQ process number of the starting subframe of the multiple subframes scheduling through the system pre-definition or RRC signaling, and increasing the HARQ process number of the starting subframe in turn to acquire the HARQ process number of the subsequent subframes;
when the downlink assignment or uplink grant only includes one Physical Resource Block (PRB), the RN learning that each subframe in the multiple subframes scheduling occupies the same PRB;
when the downlink assignment or uplink grant only includes one Modulation and Coding Scheme (MCS), the RN learning that each subframe in the multiple subframes scheduling uses the same MCS;
when the downlink assignment or uplink grant does not include a New Data Identifier (NDI), the RN learning that a NDI of each subframe in the multiple subframes scheduling is a default value; and
when the downlink assignment or uplink grant does not include a Redundancy Version (RV), the RN learning that a RV of each subframe in the multiple subframes scheduling is a default value.

17. A Relay Node (RN), comprising a processor, an acquiring module and a transmitting module, wherein,
the acquiring module is implemented by the processor and configured to acquire scheduling information of multiple subframes scheduling, wherein the scheduling information of multiple subframes scheduling includes scheduling information of downlink multiple subframes scheduling and scheduling information of uplink multiple subframes scheduling;
the transmitting module is implemented by the processor and configured to receive data on multiple continuous or discontinuous downlink backhaul subframes indicated by the scheduling information of the downlink multiple subframes scheduling, and/or send data on multiple continuous or discontinuous uplink backhaul subframes indicated by the scheduling information of the uplink multiple subframes scheduling;
wherein,
the acquiring module is configured to acquire a downlink assignment or uplink grant through a Medium Access Control (MAC) Control Element (CE), with the downlink assignment or uplink grant including the scheduling information of multiple subframes scheduling;
the acquiring module is further configured to acquire the downlink assignment and uplink grant through the same MAC CE, or acquire the downlink assignment and uplink grant through different MAC CEs; and
when the acquiring module is configured to acquire the downlink assignment and uplink grant through the same MAC CE, flag bits are added in the same MAC CE to represent whether the same MAC CE indicates downlink assignment for downlink multiple subframes scheduling or uplink grant for uplink multiple subframes scheduling.

18. The Relay Node according to claim 17, wherein,
the acquiring module is configured to receive downlink assignment or uplink grant on a Relay Physical Downlink Control Channel (R-PDCCH) according to Cell-Radio Network Temporal Identifier (C-RNTI) or a RNTI for multiple subframes scheduling, with the downlink assignment or uplink grant including the scheduling information of multiple subframes scheduling.

19. The Relay Node according to claim 17, wherein,
the scheduling information of multiple subframes scheduling comprises one or more of the following information:
a number of subframes of the multiple subframes scheduling, HARQ process number involved in the multiple subframes scheduling, Physical Resource Block (PRB) of each subframe, Modulation and Coding Scheme (MCS) of each subframe, and a mapping relationship between subframes for allocating resources and subframes for transmitting data in the multiple subframes scheduling, New Data Indicator (NDI) of each subframe and Redundancy Version (RV) of each subframe.

20. The Relay Node according to claim 17, wherein,
the acquiring module is configured to acquire a Radio Network Temporal Identifier (RNTI) for the multiple subframes scheduling through a dedicated Radio Resource Control (RRC) signaling, and then receive downlink assignment or uplink grant on a Relay Physical Resource Channel (R-PDCCH) according to the RNTI for the multiple subframes scheduling, with the downlink assignment or uplink grant including the scheduling information of multiple subframes scheduling.

\* \* \* \* \*